US008610624B2

(12) United States Patent
Savoy

(10) Patent No.: US 8,610,624 B2
(45) Date of Patent: Dec. 17, 2013

(54) SATELLITE NAVIGATION SYSTEM FAULT DETECTION BASED ON BIASED MEASUREMENTS

(75) Inventor: John Savoy, Olathe, KS (US)

(73) Assignee: Honeywell International Inc., Morristown, NJ (US)

( * ) Notice: Subject to any disclaimer, the term of this patent is extended or adjusted under 35 U.S.C. 154(b) by 278 days.

(21) Appl. No.: 13/177,063

(22) Filed: Jul. 6, 2011

(65) Prior Publication Data

US 2013/0009817 A1    Jan. 10, 2013

(51) Int. Cl.
*G01S 19/20* (2010.01)
(52) U.S. Cl.
USPC ................................... 342/357.58
(58) Field of Classification Search
USPC ................................... 342/357.58
See application file for complete search history.

(56) References Cited

U.S. PATENT DOCUMENTS

2007/0279279 A1* 12/2007 Meyers et al. ........... 342/357.02
2011/0181465 A1*  7/2011 Li et al. .................... 342/357.58

OTHER PUBLICATIONS

Axelrad, "GPS Navigation Algorithms", "Global Positioning System: Theory and Applications", 1996, pp. 409-433, vol. 1, Publisher: American Institute of Aeronautics and Astronautics, Inc.
Brenner, "Implementation of a RAIM Monitor in a GPS Receiver and an Integrated GPS/IRS", "In the Proceedings of Institute of Navigation GPS-90", Sep. 17, 1990, pp. 397-406.
Brown, "The Effect of Geometry on Integrity Monitoring Performance", "Proceedings of the Annual Insitute of Navigation Meeting", Jun. 1990, pp. 121-129, Publisher: NAVSYS Corporation.
Brown, "GPS Raim: Calculation of Thresholds and Protection Radius Using Chi-Square Methods—A geometric Approach", "RTCA Paper", Nov. 7, 1994, pp. 1-33, Publisher: RTCA Inc.
Brown, "Receiver Autonomous Integrity Monitoring", "Global Positioning System: Theory and Applications", 1993, pp. 143-165, vol. II, Publisher: American Institute of Aeronautics and Astronautics, Inc.
Brown, Grover R., "A Baseline GPS RAIM Scheme and a Note on the Equivalence of Three RAIM Methods", "Journal of the Institute of Navigation", 1992, pp. 301-316, vol. 39, No. 3, Publisher: Navigation.
Lee, "Baseline Fault Detection and Exclusion Algorithm", "RTCA Paper No. 116-95/SC159-627", Feb. 8, 1995, pp. i-7, vol. 116, No. 95, Publisher: RTCA Inc.
Parkinson, "Autonomous GPS Integrity Monitoring Using the Pseudorange Residual", "Navigation: Journal of the Institute of Navigation", Jan. 1988, pp. 255-274, vol. 35, No. 2.
RTCA, "Minimum Operational Performance Standards for Global Positioning System/Wide Area Augmentation System Airborne Equipment", "RTCA/DO-229C", Nov. 28, 2001, pp. i-R-17, Publisher: RTCA Inc.

(Continued)

*Primary Examiner* — Harry Liu
(74) *Attorney, Agent, or Firm* — Fogg & Powers LLC

(57) ABSTRACT

Example embodiments disclosed herein provide for a method for detecting a fault in a receiver for a satellite navigation system. The method includes calculating a plurality of measurement residuals corresponding to a position solution and combining the plurality of measurement residuals to form a test statistic. The method also includes calculating a threshold corresponding to the test statistic, wherein calculating the threshold includes selecting the threshold to be a value from a non-central chi squared distribution of possible test statistics that corresponds to a desired probability of false alarm. The test statistic is compared to the threshold and if the test statistic is larger than the threshold, performing at least one of: outputting an alarm indicative of a fault in the position solution and discarding the position solution.

20 Claims, 5 Drawing Sheets

(56) References Cited

OTHER PUBLICATIONS

Sturza, "Navigation System Integrity Monitoring Using Redundant Measurements", 1988, pp. 69-87, vol. 35, No. 4.

European Patent Office, "European Search Report", "from Foreign Counterpart of U.S. Appl. No. 13/177,063", Oct. 16, 2012, pp. 1-4, Published in: EP.

Diesel et al., "GPS/IRS AIME: Calculation of Thresholds and Protection Radius Using Chi-Square Methods", "Proceedings of the Intitute of Navigation", Sep. 1995, pp. 1959-1964.

Leonardi et al., "Multiple Faults Integrity Algorithm for Mode S Multilateration Systems", "Proceedings of ESAV'08", Sep. 2008, pp. 1-6.

Liu et al., "Research on Integrity Monitoring for Integrated GNSS/SINS System", "International Conference on Information and Automation", Jun. 2010, pp. 1990-1995.

Sun et al., "Raim Method for Improvement of GNSS Reliability and Integrity", "Digital Avionics Systems Conference, 2009", Oct. 2009, pp. 1-11.

* cited by examiner

SATELLITE NAVIGATION SYSTEM FAULT DETECTION BASED ON BIASED MEASUREMENTS

BACKGROUND

A satellite navigation system is a satellite based radio-navigation system in which a plurality of satellites orbit the earth and broadcast information that can be used by receivers on the earth to determine a position relative to the satellites. Example satellite navigation systems include the global positioning system (GPS), the GLONASS system, the Beidou navigation system, and the Galileo positioning system.

The GPS includes 24 or more satellites orbiting the earth at a height of 20,000 km in 6 orbital planes. These satellites broadcast ranging codes and navigation data on one or more of three different frequencies known as L1 (1,575.42 MHz), L2 (1,227.6 MHz), and L5 (1,176.45 MHz). A GPS satellite transmits navigation data containing various parameters that provide information about the satellite's position and health. Each GPS satellite transmits a unique ranging code that can be used by a GPS receiver to compute a distance from the GPS receiver to the satellite. This distance is referred to as a pseudorange, because it is uncorrected for the receiver's local clock error.

If there is no other information available to a GPS receiver, the receiver should make pseudorange measurements to 4 or more satellites in order to accurately compute the position, velocity, and time for the GPS receiver. The pseudorange measurements made by GPS receivers can be prone to several error sources like the ionospheric propagation delay, tropospheric propagation delay, satellite clock error, user clock error, multipath error, and other unexpected error sources. The unexpected error sources can include a sudden sizeable error referred to as a "step error" or a gradually increasing error referred to as a "ramp error". Such step or ramp errors typically occur rarely (e.g., a probability of about 0.0001 per flight hour), but can lead to errors in the computed position, velocity, and time.

Aviation-grade GPS receivers have been required to protect against the existence of a single faulted measurement (e.g., to detect both step and ramp errors) amongst all available measurements. Many conventional GPS receivers are well equipped to deal with the existence of a single faulted measurement. The GPS receivers typically exclude the faulted measurement from use in a navigation solution whenever possible. When it is not possible to exclude the faulted measurement, the GPS receivers can provide a warning to indicate that the output position may be corrupted and cannot be relied upon.

SUMMARY

Example embodiments disclosed herein provide for a method for detecting a fault in a receiver for a satellite navigation system. The method includes calculating a plurality of measurement residuals corresponding to a position solution and combining the plurality of measurement residuals to form a test statistic. The method also includes calculating a threshold corresponding to the test statistic, wherein calculating the threshold includes selecting the threshold to be a value from a non-central chi squared distribution of possible test statistics that corresponds to a desired probability of false alarm. The test statistic is compared to the threshold and if the test statistic is larger than the threshold, performing at least one of: outputting an alarm indicative of a fault in the position solution and discarding the position solution.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
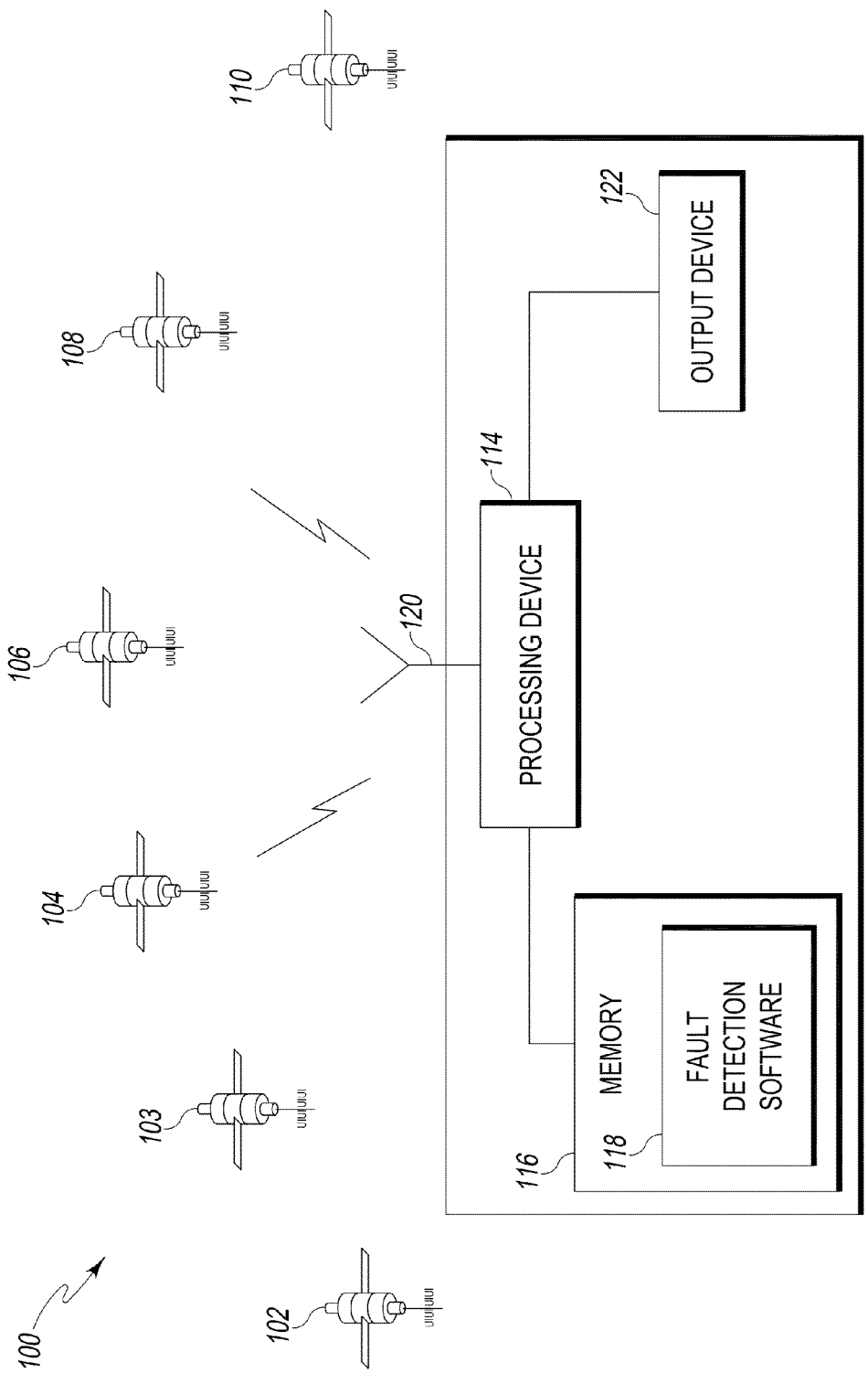
FIG. 1 illustrates an example of a satellite navigation system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below relate to detection of ramp errors in a receiver for a satellite navigation system. In particular, some embodiments described below provide methods and systems for fault detection that can take into account errors that manifest as measurement biases. For example, the methods and systems described below can apply fault detection in the presence of error sources (e.g., SA, ionospheric propagation delay) that are expected to cause errors that are highly correlated for long periods of time. This fault detection (FD) can take into account the effects of expected biases and expected noise terms separately which can enable a receiver to be more accurate (e.g., less conservative) when estimating the integrity of the navigation function. Conventional FD, in contrast, accounts for the expected biases in the error sources by assuming that the bias can be modeled by a large uncorrelated noise term and combining that model with the expected random noise. This conventional FD, therefore, does not separate biased errors from unbiased noise which can cause the receiver to be more conservative when estimating the integrity of the navigation function.

FIG. 1 illustrates one example of a satellite navigation system 100. The satellite navigation system 100 includes a plurality of satellites 102-110 and one or more receivers 112. As mentioned above, the satellites 102-110 can transmit signals for reception by the receiver 112. The receiver 112 can receive a signal from one or more of the satellites 102-110 and calculate a position solution based on the signals. Example satellite navigation systems 100 include the global positioning system (GPS), the GLONASS system, the Beidou navigation system, and the Galileo positioning system.

The receiver 112 can include one or more processing devices 114 coupled to one or more memory devices 116. The one or more memory devices 116 can include instructions 118 which, when executed by the one or more processing devices 114, can cause the one or more processing devices 114 to perform one or more acts. As used herein, the receiver 112 is configured to perform a function when the memory 116 includes instructions 118 which, when executed by the processing device 114, cause the processing device 114 to perform the function.

In an example, the one or more processing devices 114 can include a microprocessor, a microcontroller, a digital signal processor, etc. The one or more memory devices 116 can include any appropriate processor readable medium used for storage of processor readable instructions or data structures.

The receiver 112 can also include an antenna 120 coupled to the processing device 114 and configured to sense signals from the satellites 102-110. In an example, the receiver 112 can include one or more output devices 122 to provide information to a user. The output device 122 can include a display, a speaker, a haptic feedback generator, a light, and other output mechanisms. In an example, the receiver 112 can be integrated into a larger electronic device (e.g., a mobile phone, laptop, tablet, etc.) or a vehicle (e.g., a car, aircraft, boat, etc.).

In an example, the receiver 112 is configured to measure the amount of time a signal takes to travel from the satellites 102-110 to the antenna 120 and thus estimate the distance between the satellites 102-110 and the antenna 120. This distance estimate is referred to as a "pseudorange". A pseudorange can be corrupted with errors as the signal transmitted by the satellite 102-110 propagates through the variable atmosphere (not shown). Normally, the receiver 112 can compensate for these errors using standard models. The receiver 112 can be further configured to calculate a position solution based on multiple pseudoranges. The position solution can be in any form including earth relative coordinates (e.g., a latitude, longitude, and altitude).

In order to provide a level of assurance that a position solution calculated by the receiver 112 is valid, the receiver 112 can attempt to determine whether a fault has occurred in a measurement used to calculate the position solution. In an example, a fault may occur in a satellite 102 which causes the pseudorange measurement to that satellite to slowly increase or decrease. This slow increase or decrease is known as a ramp error. In order to detect a fault, the receiver 112 can perform redundant measurements, that is, more measurements than used to determine a basic position solution. The receiver can then determine if there are any inconsistencies between measurements to determine if a fault has occurred. In many examples, a minimum of 5 pseudoranges are used to detect a fault, but more or fewer can be used depending on the architecture of the receiver 112.

Figure 2:
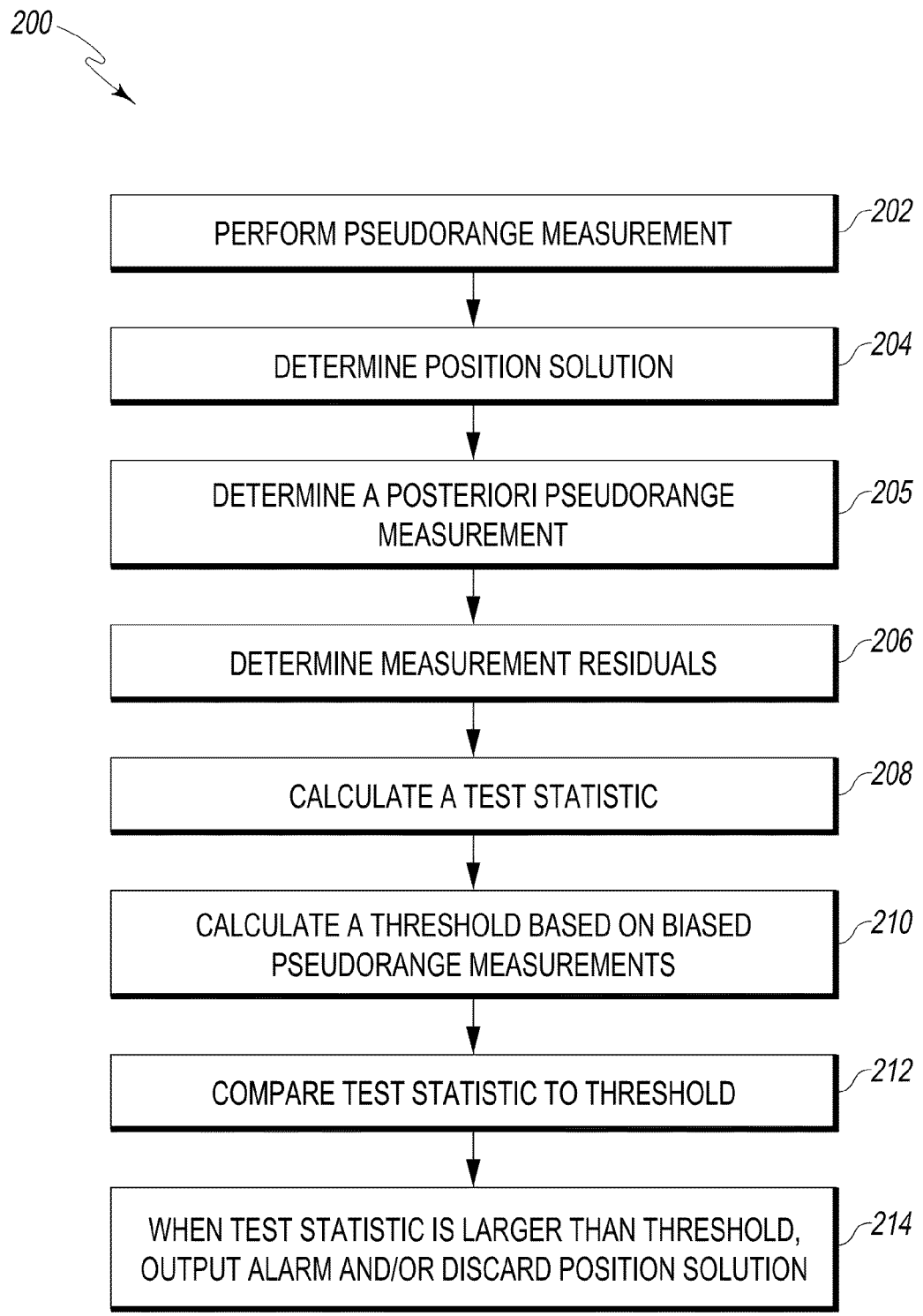
FIG. 2 illustrates an example of a method for determining if a fault in a pseudorange measurement has occurred.

FIG. 2 illustrates an example of a method 200 for determining if a fault in a pseudorange measurement has occurred. At block 202, the receiver 112 can make five or more pseudorange measurements, $\rho_i$. A pseudorange measurement can be based on one signal from satellite 102-110, a signal from a ground-based reference station, be derived pressure altimeters, or may by other similar mechanism.

In an example, a model for a pseudorange measurement to a satellite 102 is given as $\rho_i=|r_i-r_u|+c \cdot b_u+\epsilon_{\rho_i}$, where $r_i$ is the position of the $i^{th}$ satellite, $r_u$ is the position of the receiver 112, $b_u$ is the clock bias (in seconds) for the receiver 112, and $\epsilon_{\rho_i}$ is the error of the measurement. This error include normal errors in the clock of the satellites 102-110, delays introduced by propagation of the signal through the atmosphere, errors caused by the reception of reflected signals from the satellite as well as the direct signal among others.

At block 204, the receiver 112 can determine a position solution. The position solution, $\hat{x}_u$, to be determined, consisting of $r_u$ and $c \cdot b_u$, is embedded in the above equation referenced at block 202. This position solution may be computed using any appropriate technique including least squares, Kahlman filtering, or other similar technique.

At block 205, an a posteriori pseudorange measurement estimate can be determined given an a posteriori estimate of the position solution $\hat{x}_u=[\hat{r}_u{}^T c \cdot b_u]$, and an estimate of the bias contributions caused by ionospheric and tropospheric delay, relativistic effects, satellite clock errors, $\hat{\epsilon}_{\rho_i}$. The a posteriori pseudorange measurement estimate can be defined as follows: $\hat{\rho}_i=|r_i-\hat{r}_u|+c \cdot b_u+\hat{\epsilon}_{\rho_i}$. Accordingly, this a posteriori pseudorange measurement estimate is based on the position solution computed by the receiver 112 in contrast with an (actual) pseudorange measurement which is used to calculate the position solution and is obtained, for example, based on a measurement of the time it takes a signal to travel from a satellite 102-110 to the antenna 120.

At block 206, the receiver 112 can determine a plurality of measurement residuals, z. Measurement residuals comprise a difference between the a posteriori pseudorange, $\hat{\rho}_i$, and an (actual) pseudorange measurement, $\rho_i$. In this example, the measurement residual, z, can then be modeled as linearly related to the error in the position solution, $\Delta x \equiv [\Delta r c \cdot \Delta b]^T$, by performing a Taylor expansion about the current position solution estimate. This linearized result can be given as follows:

$$z_i = \hat{\rho}_i - \rho_i = \begin{bmatrix} -\hat{l}_i^T & 1 \end{bmatrix} \begin{bmatrix} \Delta r \\ c \cdot \Delta b \end{bmatrix} + \Delta \varepsilon_{\rho_i}, \text{ where}$$

$$l \equiv \frac{r_i - \hat{r}_u}{|r_i - \hat{r}_u|}, \Delta r \equiv \hat{r}_u - r_u, \Delta b \equiv \hat{b}_u - b_u, \text{ and}$$

$$\Delta \varepsilon_{\rho_i} \equiv \hat{\varepsilon}_{\rho_i} - \hat{\varepsilon}_{\rho_i}.$$

When more pseudorange measurements than are required to determine a basic position solution without fault detection are made and incorporated into the position solution, the measurement residuals can be used to identify the errors that are present in the pseudorange measurements, although the relationship is not straightforward.

At block 208, the receiver 112 can calculate a test statistic, d. In an example, the plurality of measurement residuals, z, can be combined to form the test statistic, d, that comprises the plurality of measurement residuals combined by squaring each measurement residual and then summing the squared measurement residuals. That is, $d=\check{z}^T\check{z}$.

At block 210, the receiver 112 can calculate a threshold, T. The threshold can be used to compare with the test statistic to determine whether a fault has occurred and can be selected such that a desired probability of false alarm, $P_{fa}$, is achieved. This threshold can be selected in such a manner as to minimize the probability of false alarm while maximizing the sensitivity of the test statistic to true errors. In an example, the smallest threshold which provides the specified probability of false alarm, $P_{FA}$, is the most desirable and is therefore selected.

The value of T can be computed by solving the following expression for T. $1-P_{FA}=\int_0^T PDF(x)\partial x$ where PDF(x) is the Probability Distribution Function of the test statistic, d, assuming that no measurements include the effects of satellite failures. Typical implementations of prior art assume that the test statistic formed with unfaulted measurements will be taken from a $X^2$ distribution with N-4 degrees of freedom. This is consistent with the assumption that unfaulted measurement errors consist of only zero-mean, Gaussian random variables. This assumption simplifies the mathematics behind computation of the test statistic greatly, but makes the test statistic more conservative when the unfaulted measurements contain errors that are drawn from other probability distributions, particularly, those with a non-zero mean. Selecting a threshold, T, that achieves a desired probability of false alarm, $P_{fa}$, can be interpreted graphically as shown in FIG. 3.

Figure 3:
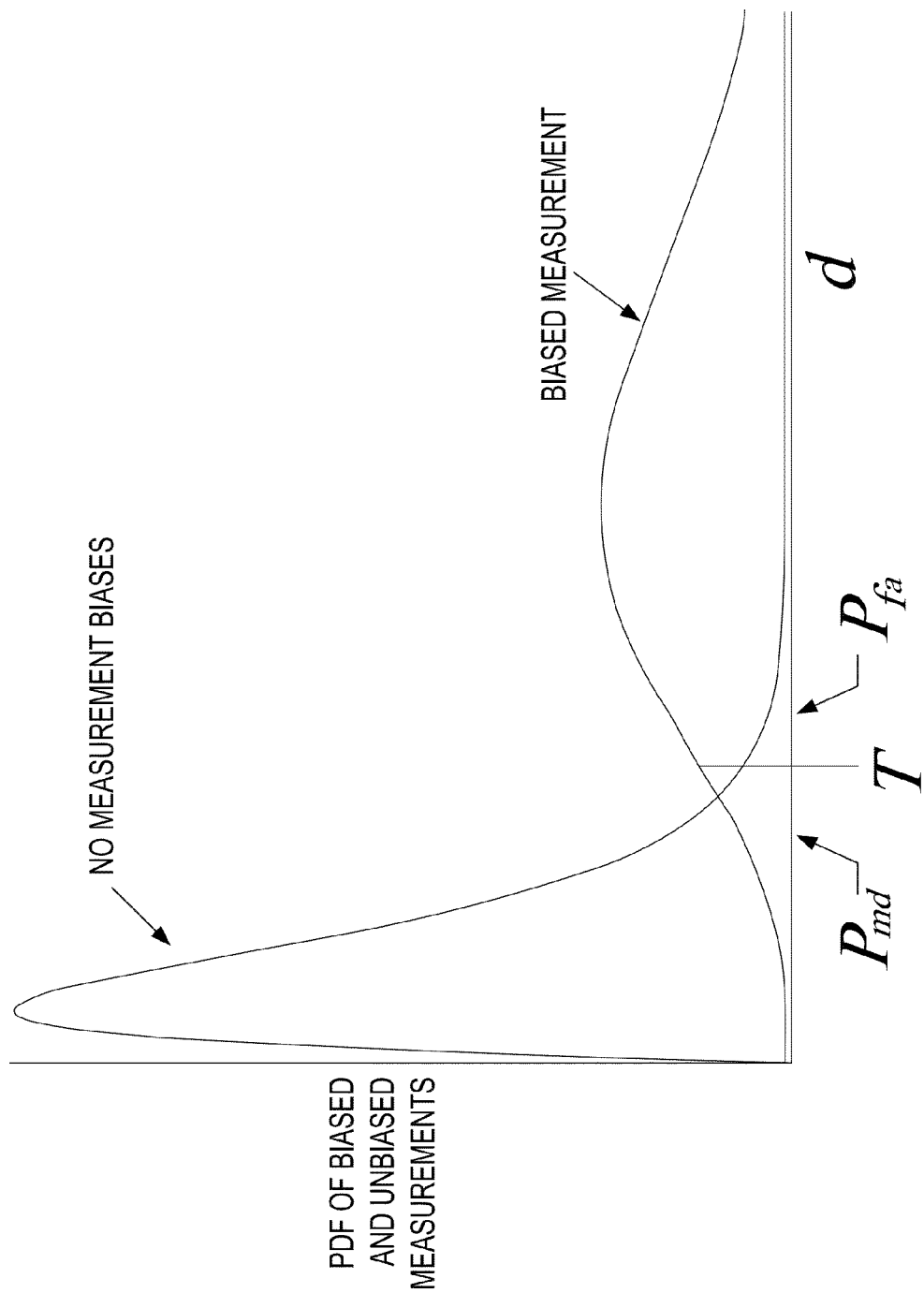
FIG. 3 illustrates a graphical representation of an example of a threshold for a test statistic that achieves a desired probability of false alarm.
Figure 4:
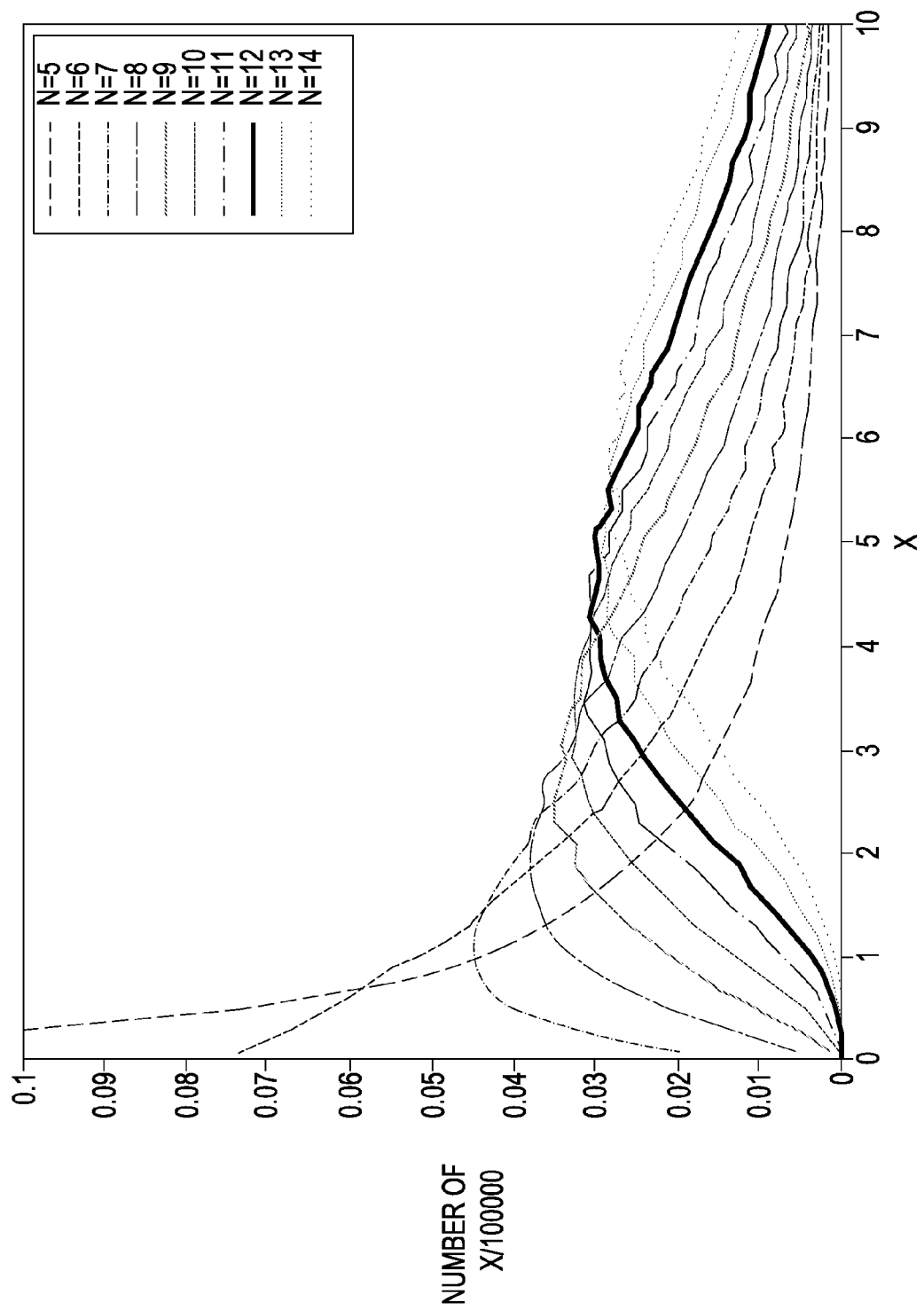
FIG. 4 illustrates a histogram showing a chi squared distribution in example test statistics.

For example, when non-zero mean, or bias in the pseudorange measurement is not taken into account (e.g., the signals from the satellites 102-110 for the pseudorange measurements are considered to contain zero mean white noise), the threshold, T, can be selected such that the area to the right of the T in FIG. 3, under curve 302 (the "no measurement bias" curve) is equal to the desired probability of false alarm, $P_{fa}$. When bias in the pseudorange measurement is not taken into account and no satellite failures are observed, the PDF can be taken to a central chi squared distribution.

The receiver 112 takes bias in the pseudorange measurement into account when calculating the threshold, T. That is, the receiver 112 can take into account non-zero mean noise in the signals from the satellites 102-110 used for the pseudorange measurement. Several error sources, including satellite ephemeris errors and ionospheric delay errors can be comprised of components with very long time constants.

The receiver 112 can calculate the threshold, T, based on the assumption that the pseudorange measurements are biased by a random amount with a bias that is normally distributed. That is, the pseudorange measurement error can be given by $$\epsilon_{\rho_i}=\eta(\mu_{\rho,i},\sigma_{\rho,i}), \mu_{\rho,i}=\eta(0,\sigma_B).$$

With these assumptions and for a given set of measurement biases, the PDF of the test statistic is not longer a $X^2$ distribution, but a non-central $X^2$ distribution. The threshold T can instead be computed using the following expression $$1-P_{fa}=\int_0^T f_{\chi^2}(x,N,\lambda)\partial x$$

$$f_{\chi^2}(x,n,\lambda)=\begin{cases} \dfrac{e^{\frac{-(x+\lambda)}{2}}}{2^{\frac{n}{2}}}\sum_{j=0}^{\infty}\dfrac{\lambda^j x^{(n/2)+j-1}}{\Gamma\left(\frac{n}{2}+j\right)\cdot 2^{2j}\cdot j!} & x>0 \\ 0 & x\leq 0 \end{cases}$$

$$\Gamma(t)=\int_0^{\infty}x^{t-1}e^{-x}\partial x,$$

where $$n=N-4$$

n is the number of degrees of freedom and $\lambda$ is the non-centrality parameter. $\lambda$ itself, however, is derived from the specific biases assumed for the measurement errors. Since these biases are random variables, $\lambda$ is also a random variable. In fact, $\lambda$ has a chi squared distribution itself.

Figure 5:
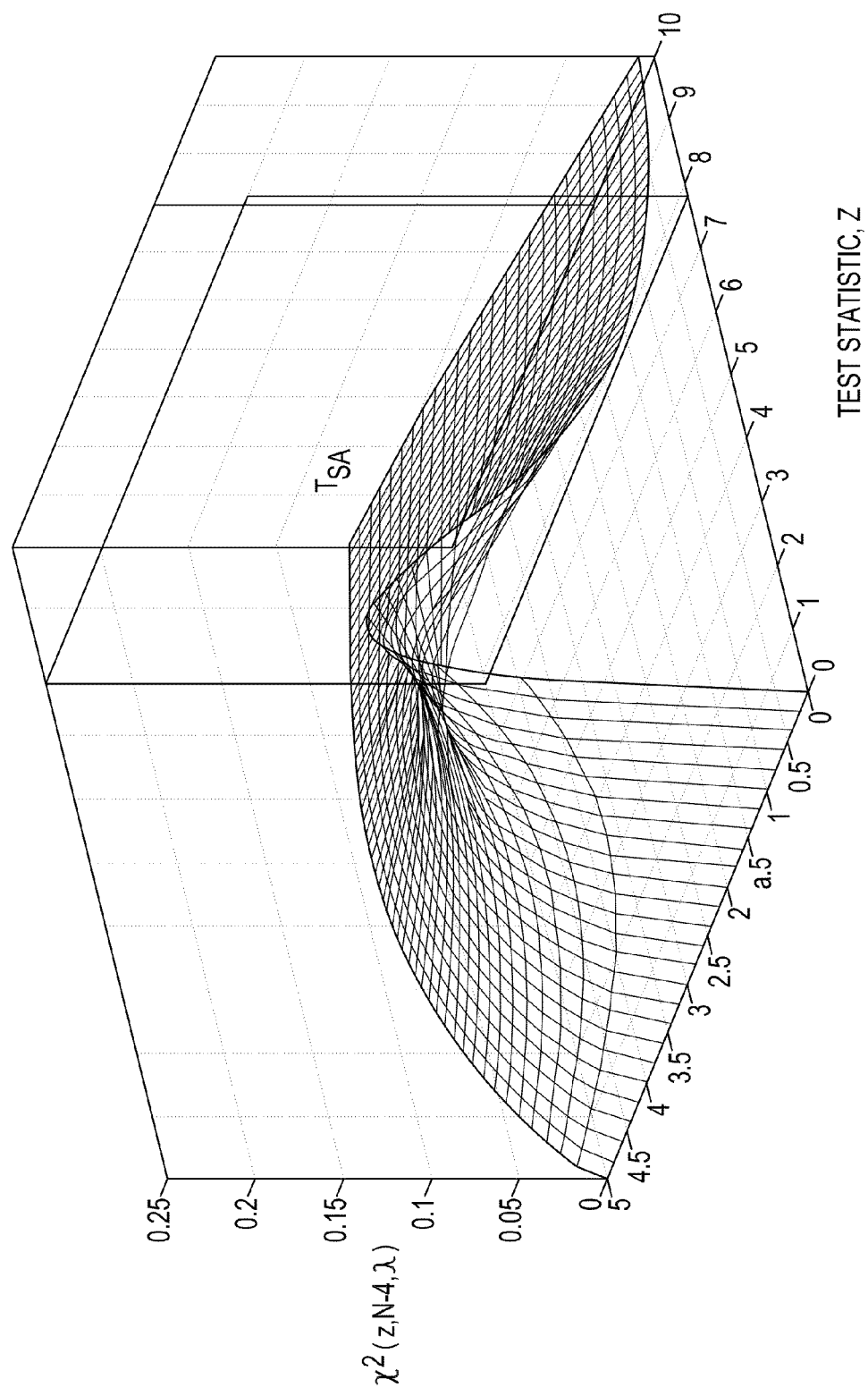
FIG. 5 illustrates a graphical representation of an example of a threshold for a test statistic that achieves a desired probability of false alarm while factoring in bias in the measurements.

Thus, to calculate the threshold, T, the receiver 112 can select the threshold to be a value from a non-central chi squared distribution of possible test statistics, wherein the selected value corresponds to a desired probability of false alarm. That is, given any particular non-centrality parameter, $\lambda$, the threshold with respect to that parameter $T(\lambda)$ can be calculated using the equation $$1-P_{fa}=\int_0^T f_{\chi^2}(x,N,\lambda)\partial x$$

above. Then, using Bayes Theorem, the system can integrate over all potential values of the non-centrality parameter, $\lambda$, to get $1-P_{FA}=\int_0^{\infty}\chi^2(\lambda,N-M,0)\int_0^T\chi^2(x,N-M,\lambda)\partial x\partial\lambda$, where $P_{FA}$ corresponds to the probability of false alarm, $\chi$ corresponds to the distribution of possible test statistics, $\lambda$ corresponds to a non-centrality parameter, T, corresponds to the threshold, x corresponds to the measurement residual, and M corresponds to the number of unknowns in the system. In a satellite navigation system, Bayes Theorem, the receiver 112 number of unknowns is equal to 4 and the equation is therefore $1-P_{FA}=\int_0^{\infty}\chi^2(\lambda,N-4,0)\int_0^T\chi^2(x,N-4,\lambda)\partial x\partial\lambda$. This is equivalent to finding the volume to the right of the plane labeled T in FIG. 5 weighted by the probability of the corresponding non-centrality parameter $\lambda$.

At block 212, the test statistic calculated at block 208 can be compared to the threshold calculated at block 210. A test statistic that is larger than the threshold is considered to be a fault. A test statistic that is smaller than the threshold is considered to be valid and corresponds to a valid position solution.

Accordingly, at block 214, when the test statistic is larger than the threshold, the receiver 112 can perform an appropriate action to account for a faulted measurement. In an example, the receiver 112 can output an alarm indicative of the fault. For example, the alarm can indicate that the position solution provided may be inaccurate and/or that a fault has occurred in a measurement used to calculate the position solution. In another example, the receiver 112 can discard the position solution. The receiver 112 can then attempt to re-calculate a position solution using a different combination of pseudorange measurements in an attempt to avoid one or more pseudorange measurements that are causing the fault. For example, if a first position solution is calculated based on pseudorange measurements from satellites 102, 103, 104, 106, 108, and 110 and a fault is determined with respect to this first position solution, then a second position solution can be calculated based on pseudorange measurements from satellites 102, 103, 104, 106, and 108, but excluding satellite 110. If faults continue to occur, this process can be repeated excluding other satellites until a position solution can be calculated without a fault, if possible.

When the test statistic is smaller than the threshold, the receiver 112 can perform an appropriate action based on a valid position solution. For example, the receiver 112 can output the position solution as a valid (e.g., accurate to within accepted bounds for the receiver 112).

Calculating the threshold, T, while taking into account bias in the pseudorange measurement can enable the threshold, T to be more accurate than when bias is not taken into account. Since the threshold T can be calculated more accurately, more precision can be used when determining whether a position solution corresponds to a fault.

Conventional systems that do not take into account biases in the pseudorange measurements typically implement a "fudge factor" that blindly increases the size of the position solution error (e.g., after an initial position solution error is calculated based on the measured errors) to account for unknown errors, including bias in the measurements. Using the methods and systems described herein, however, bias in the measurements can be taken into account directly, and the size of the position solution error can be more accurately determined. Thus, a "fudge factor" to account for the bias is not needed. Taking the bias into account directly typically can result in the receiver 112 identifying problems more rapidly and before they can impact systems relying on the position solution.

As mentioned above, the methods and acts described herein can correspond to instructions on processor-readable media. The processor-readable media can be implemented as any available media that can be accessed by a general purpose or special purpose computer or processor, or any programmable logic device. Suitable processor-readable media can include tangible media, such as storage or memory media, and transmission media such as electrical, electromagnetic, or digital signals, conveyed via a communication medium such as a network and/or a wireless link.

Storage or memory media can include magnetic or optical media, such as conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for detecting a fault in a receiver for a satellite navigation system, the method comprising:
    calculating a plurality of measurement residuals corresponding to a position solution;
    combining the plurality of measurement residuals to form a test statistic;
    calculating a threshold corresponding to the test statistic, wherein calculating the threshold includes selecting the threshold to be a value from a non-central chi squared distribution of possible test statistics that corresponds to a desired probability of false alarm;
    comparing the test statistic to the threshold; and
    if the test statistic is larger than the threshold, performing at least one of:
    outputting an alarm indicative of a fault in the position solution and discarding the position solution.

2. The method of claim 1, wherein calculating a threshold includes integrating over potential values for a non-centrality parameter, the non-centrality parameter corresponding to the non-central chi squared distribution of possible test statistics.

3. The method of claim 1, wherein combining the plurality of measurement residuals includes squaring each measurement residual of the plurality of measurement residuals and summing the squared measurement residuals to form the test statistic.

4. The method of claim 1, wherein a measurement residual includes a difference between a predicted range based on the position solution and an actual pseudorange measurement used to calculate the position solution.

5. The method of claim 1, wherein the threshold is selected by choosing a threshold that satisfies the equation, $1-P_{FA}=\int_0^\infty x^2(\lambda, N-M, 0)\int_0^T x^2(x, N-M, \lambda)\partial x \partial \lambda$, where $P_{FA}$ corresponds to the probability of false alarm, $\chi$ corresponds to the distribution of possible test statistics, $\lambda$ corresponds to a non-centrality parameter, T corresponds to the threshold, x corresponds to the measurement residual, and M corresponds to the number of unknowns in the system.

6. The method of claim 5, wherein the equation takes into account that error in pseudorange measurements by the receiver are biased by a random amount.

7. The method of claim 1, comprising:
    when the test statistic is smaller than the threshold, outputting the position solution as valid.

8. An apparatus for detecting a fault in a position solution for a satellite navigation system, the apparatus comprising:
    at least one processing device;
    an output device coupled to the at least one processing device;
    a receiver for a satellite navigation system coupled to the at least one processing device; and
    at least one memory device coupled to the at least one processing device, the at least one memory device having instructions thereon for execution by the at least one processing device, wherein the instructions, when executed by the at least one processing device, cause the at least one processing device to:
    calculate a plurality of measurement residuals corresponding to a position solution of the receiver;
    combine the plurality of measurement residuals to form a test statistic;
    calculate a threshold corresponding to the test statistic, wherein calculate the threshold includes select the threshold to be a value from a non-central chi squared distribution of possible test statistics that corresponds to a desired probability of false alarm;
    compare the test statistic to the threshold; and
    if the test statistic is larger than the threshold, perform at least one of:
    output an alarm from the output device, the alarm indicative of a fault in the position solution and discard the position solution.

9. The apparatus of claim 8, wherein calculate a threshold includes integrate over potential values for a non-centrality parameter, the non-centrality parameter corresponding to the non-central chi squared distribution of possible test statistics.

10. The apparatus of claim 8, wherein combine the plurality of measurement residuals includes square each measurement residual of the plurality of measurement residuals and sum the squared measurement residuals to form the test statistic.

11. The apparatus of claim 8, wherein a measurement residual includes a difference between a predicted range based on the position solution and an actual pseudorange measurement used to calculate the position solution.

12. The apparatus of claim 8, wherein the threshold is selected by choosing a threshold that satisfies the equation, $1-P_{FA}=\int_0^\infty x^2(\lambda, N-M, 0)\int_0^T x^2(x, N-M, \lambda)\partial x \partial \lambda$, where $P_{FA}$ corresponds to the probability of false alarm, $\chi$ corresponds to the distribution of possible test statistics, $\lambda$ corresponds to a non-centrality parameter, T corresponds to the threshold, x corresponds to the measurement residual, and M corresponds to the number of unknowns in the system.

13. The apparatus of claim 12, wherein the equation takes into account that error in pseudorange measurements by the receiver are biased by a random amount.

14. The apparatus of claim 8, wherein the instructions, when executed by the at least one processing device, cause the at least one processing device to:

when the test statistic is smaller than the threshold, output the position solution as valid from the output device.

15. A non-transitory processor-readable medium including instructions which, when executed by at least one processor, cause the at least one processor to:

calculate a plurality of measurement residuals corresponding to a position solution of the receiver;

combine the plurality of measurement residuals to form a test statistic;

calculate a threshold corresponding to the test statistic, wherein calculate the threshold includes select the threshold to be a value from a non-central chi squared distribution of possible test statistics that corresponds to a desired probability of false alarm;

compare the test statistic to the threshold; and if the test statistic is larger than the threshold, perform at least one of: output an alarm from the output device, the alarm indicative of a fault in the position solution and discard the position solution.

16. The processor-readable medium of claim 15, wherein calculate a threshold includes integrate over potential values for a non-centrality parameter, the non-centrality parameter corresponding to the non-central chi squared distribution of possible test statistics.

17. The processor-readable medium of claim 15, wherein combine the plurality of measurement residuals includes square each measurement residual of the plurality of measurement residuals and sum the squared measurement residuals to form the test statistic.

18. The processor-readable medium of claim 15, wherein a measurement residual includes a difference between a predicted range based on the position solution and an actual pseudorange measurement used to calculate the position solution.

19. The processor-readable medium of claim 15, wherein the threshold is selected by choosing a threshold that satisfies the equation, $1-P_{FA}=\int_0^\infty x^2 (\lambda, N-M, 0) \int_0^T x^2 (x, N-M, \lambda) \partial x \partial \lambda$, where $P_{FA}$ corresponds to the probability of false alarm, $\chi$ corresponds to the distribution of possible test statistics, $\lambda$ corresponds to a non-centrality parameter, T corresponds to the threshold, x corresponds to the measurement residual, and M corresponds to the number of unknowns in the system.

20. The processor-readable medium of claim 19, wherein the equation takes into account that error in pseudorange measurements by the receiver are biased by a random amount.

* * * * *